United States Patent [19]

Hunt

[11] Patent Number: 4,871,286
[45] Date of Patent: Oct. 3, 1989

[54] GROOVING OR THREADING TOOL

[75] Inventor: Carl E. Hunt, Davisburg, Mich.

[73] Assignee: GTE Valenite Corporation, Troy, Mich.

[21] Appl. No.: 348,140

[22] Filed: May 5, 1989

Related U.S. Application Data

[63] Continuation of Ser. No. 262,762, Oct. 24, 1988, abandoned.

[51] Int. Cl.$^4$ ............................................. B23B 27/00
[52] U.S. Cl. ...................................... 408/144; 82/158;
 279/8; 407/46; 408/199; 408/239 R; 408/713
[58] Field of Search .................... 82/1.2, 158; 408/141,
 408/143, 144, 199, 200, 231, 238, 239 R, 239 A,
 713; 279/8; 407/46

[56] References Cited

U.S. PATENT DOCUMENTS

| | | |
|---|---|---|
| 2,426,359 | 8/1947 | Lankheet . |
| 2,640,378 | 6/1953 | Haggar . |
| 2,842,014 | 7/1958 | Miller . |
| 2,858,718 | 11/1958 | Kohler . |
| 2,922,322 | 1/1960 | Kleine . |
| 3,164,041 | 1/1965 | Carlstedt . |
| 3,178,969 | 4/1965 | Yogus et al. ........................ 408/154 |
| 3,238,600 | 3/1966 | Milewski ............................. 408/226 |
| 3,250,154 | 5/1966 | Breuning ............................. 408/199 |
| 3,447,402 | 6/1969 | Ray . |
| 3,599,996 | 8/1971 | Holt ..................................... 279/1 B |
| 3,678,632 | 7/1972 | Eversole et al. ....................... 408/58 |
| 3,699,843 | 10/1972 | Sweeny ................................ 408/226 |
| 3,820,422 | 6/1974 | Rivin et al. .......................... 408/143 |
| 3,841,785 | 10/1974 | Werther ................................ 408/226 |
| 3,923,414 | 12/1975 | Hopkins ............................... 408/143 |
| 3,938,626 | 2/1976 | Hopkins ............................... 408/143 |
| 4,167,218 | 9/1979 | Horiuchi et al. ................... 408/239 R |
| 4,293,253 | 10/1981 | Ott ....................................... 408/226 |
| 4,383,784 | 5/1983 | Gulbrandsen ....................... 408/144 |
| 4,604,010 | 8/1986 | Reeves ................................ 409/233 |
| 4,622,871 | 11/1986 | Van Sickle et al. .................. 82/1.2 |
| 4,632,614 | 12/1986 | Rall et al. ............................ 409/233 |

FOREIGN PATENT DOCUMENTS 1051610 2/1959 Fed. Rep. of Germany ........ 408/59
3237128 4/1984 Fed. Rep. of Germany .

OTHER PUBLICATIONS

"A Chatter-Resistant Cantilever Boring Bar" by Eugene I. Rivin, Wayne State Univ.
"An Extra-Long Cantilever Boring Bar With Enhanced Chatter Resistance" by Eugene I. Riv in and Xiap-Zhong Wu Wayne State Univ.

Primary Examiner—Daniel Howell
Attorney, Agent, or Firm—Robert E. Walter

[57] ABSTRACT

An elongated grooving or threading tool has a cutting section and a rearward cemented carbide section which are, respectively, held together in axial alignment by a threaded fastener and a drawbolt which engage the intermediate section and hold the respective connections under compression.

6 Claims, 2 Drawing Sheets

GROOVING OR THREADING TOOL

Cross Reference to Related Applications

This is a continuation of copending application Ser. No. 262,726, filed on Oct. 24, 1988 now abandoned.

Copending application, U.S. Ser. No. 07/132,086, filed Dec. 11, 1987, entitled VIBRATION DAMPENED BORING BAR, by C. E. Hunt, relates to cantilever tools having a structure for dampening vibrations, and two additional applications both entitled Grooving or Threading Tool, by C E. Hunt, having Ser. Nos. 261,194 and 261,309 are filed concurrently herewith.

FIELD OF THE INVENTION

The present invention relates to grooving or threading tools of the type having a longitudinal axis and a radially projecting cutting edge for grooving or threading applications.

BACKGROUND OF THE INVENTION

To accurately groove or thread small diameter cylindrical parts such as bars, tubes or pipes on either the inside or outside, it is often desirable to utilize an elongated tool. Such tools typically have a radially projecting cutting edge corresponding to the desired size of the groove or thread. Generally the part being grooved or threaded is rotated and, even axially moved for threading applications, while the cutting edge removes material. However, such tools may be rotated along the longitudinal axis for some cutting applications.

For some applications it is desirable to use a tool with a small diameter, so the tool can easily fit into the interior of a small diameter cylindrical opening. Due to the demands of industry for increased accuracy, it is desirable that the tool retain its rigidity and dimensional accuracy even when threading openings that extend deeply into the material being grooved or threaded. Due to the demands of industry for increased efficiency, it is desirable that the tool retain its sharpness and be capable of multiple operations for various sizes of grooves and threads. The present practice of reshaping and reshaping tools is time consuming and hence uneconomical.

The present invention concerns the production of an optimized grooving or threading tool constructed of materials which contribute to prolong tool life and are structurally combined in such a manner so as to permit grooving or threading with enhanced dimensional accuracy.

SUMMARY OF THE INVENTION

It is an object of the present invention to provide a grooving or threading tool with increased rigidity at the cutting section for enhancing the accuracy of machining operations.

It is an object of the present invention to provide a grooving or threading tool in which the various parts can be readily disassembled and replaced.

It is a further object of the present invention to select materials which provide prolonged life and enhanced dimensional accuracy for a grooving or threading tool.

It is an object of the present invention to provide a grooving or threading tool utilizing a combination of different materials having an improved connection therebetween.

It is an object of the present invention to increase the stiffness of the joint at the transition of the different materials being utilized.

In accordance with the present invention, there is provided an elongated grooving or threading tool of the type having a radially projecting cutting edge. The tool comprises a cutting section having an axially extending bore and a radially projecting cutting edge, a cylindrically shaped intermediate steel section having a threaded bore, and a hollow cylindrically shaped cemented carbide section. A drawbar which is connected between one end of the intermediate section and the cemented carbide section and a threaded fastener is connected between the cutting section and the other end of the intermediate section. The drawbar includes means for centering said drawbar relative to the rearward section for preventing relative radial movement between the forward end of the drawbar and the rearward cemented carbide section Each connection comprises a key and a keyway and additionally a pair of first and second surfaces. The first surfaces and second surfaces respectively, extend on either side of the respective key or keyway and lie substantially within a plane perpendicular to the axis of rotation. The first surfaces are adapted to mate with the second surfaces for maintained axial alignment of the respective sections and along the axis of rotation and increasing the stiffness of the joint.

The connection has a specific configuration adapted for joining the hollow cemented carbide section and the cutting section to the intermediate section. In addition to comprising a drawbar for holding the respective sections under compression for increasing the stiffness of the tool at the joints, the connection includes a key and a keyway and an additional pair of mating surfaces as set forth above. Preferably, the first and second surfaces of the respective cutting section or the cemented carbide section comprise a major portion of the cross-sectional area of the respective section.

DESCRIPTION OF THE PREFERRED EMBODIMENT

Figure 1:
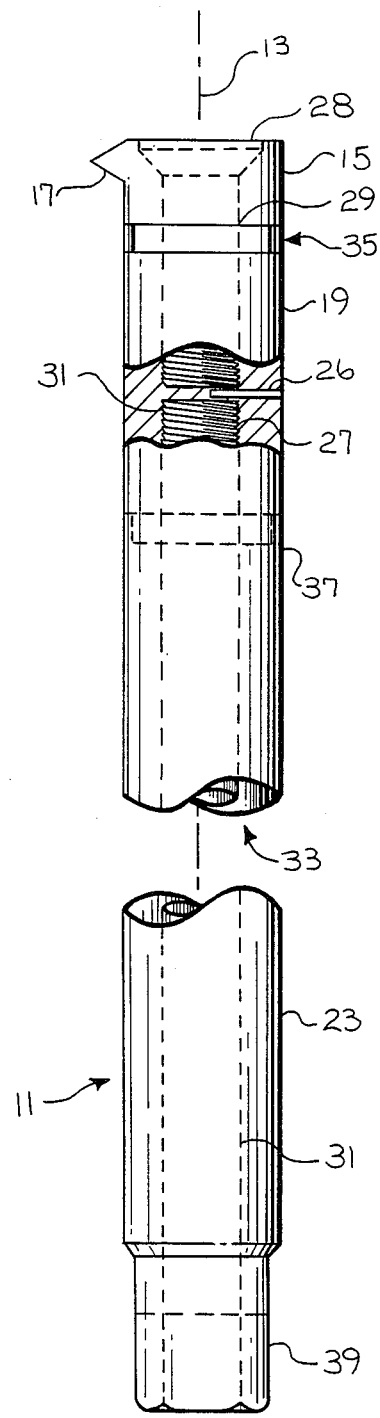
FIG. 1 is a plan view of the grooving or threading tool showing a portion in section.
Figure 4:
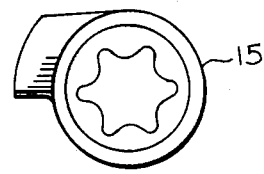
FIG. 4 is an end view of the cutting section showing FIG. 3.

The embodiment of this invention as set forth in the drawings is particularly suited for achieving the objects of this invention. FIG. 1 depicts a cylindrically shaped grooving or threading tool 11 having a central longitudinal axis. If the grooving or threading tool 11 is rotated so to cut the work, the longitudinal axis 13 is parallel to or coincides with the axis of rotation. In case the work is rotated, the longitudinal axis 13 is parallel to or coincides with the central axis of the part or bore being cut. A forwardly projecting cutting section 15 has a radially projecting cutting edge 17 adapted to be driven into the work being cut for grooving or threading purposes. An intermediate section 19 which is formed of a steel material is positioned between the rearward section 23 and the cutting section 15. The rearward section 23 is a cemented tungsten carbide body which may have a longitudinally extending flat section 25 on the outer periphery for engaging a holding mechanism for securing the grooving or threading tool 11 during a cutting operation. In the case where the workpiece is turned and the grooving or threading tool 11 remains stationary, the flat section 25 permits holding the grooving or threading tool 11 in a stationary position.

Figure 3:
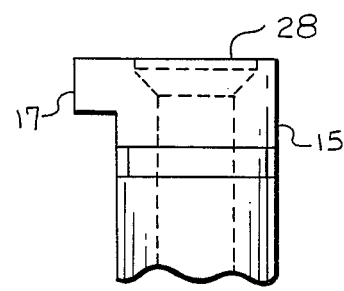
FIG. 3 is a plan view of the cutting section.
Figure 2:
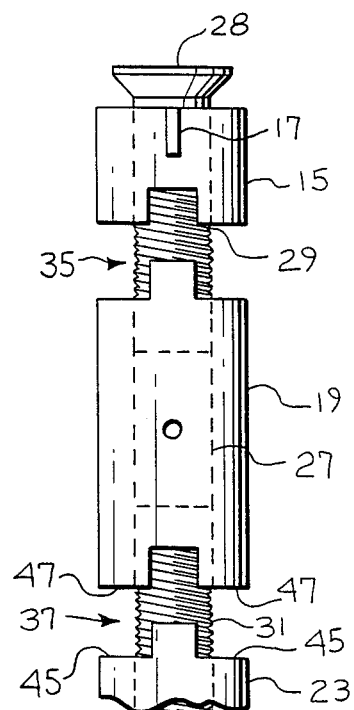
FIG. 2 is a side elevational view showing the connections between the intermediate section and the respective cutting section and cemented carbide section of FIG. 1.
Figure 9:
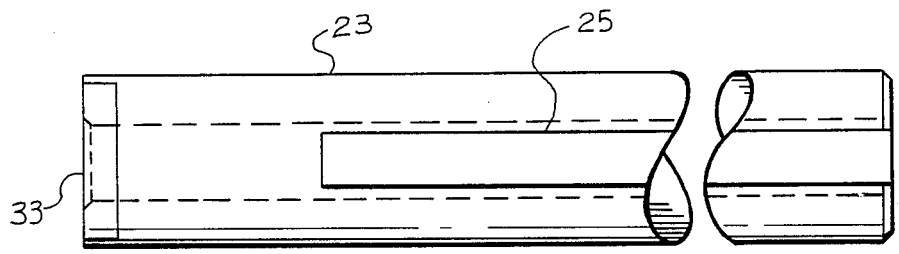
FIG. 9 is a plan view of the cemented carbide section shown in FIG. 8.

As illustrated in FIGS. 1 to 4, the configuration of the cutting section 15 is shown. The forwardly projecting cutting section 15 is preferably made of a hard cutting tool material such as cemented carbide or hardened steel. The preferable materials comprise a cemented carbide. The cutting section 15 includes a radially projecting cutting edge 17 having the shape of the desired thread or groove. If a thread is being cut, the cutting edge or surface 17 has a pointed configuration as shown in FIG. 1 or if a rectangular groove is being cut the cutting edge 17 has a rectangular configuration as shown in FIG. 3. The edge 17 is displaced from the longitudinal axis 13 or the peripheral surface of the generally cylindrically shaped cutting section 15 a sufficient distance to give the proper depth of cut. The area behind the cutting edge 17 blends into the cylindrically portion of the cutting section so as to strengthen the cutting surface or edge 17. As shown in FIGS. 1 and 2, the cutting section 15 includes a centrally located and axially aligned bore 29 for positioning and holding purposes.

As shown in the cross-sectional portion of FIG. 1, the rearward end of the cutting section 15 is connected to a intermediate section 19 with a threaded bore 27. The threaded bore 27 extends in an axial direction entirely through the intermediate section 19. The forward portion of the portion of the threaded bore 27 adjacent the cutting section 15 is adapted to receive a threaded fastener 28 in the form of a bolt having a head configured to permit tightening with an appropriately shaped wrench. The threaded shank of the fastener 28 extends through the bore 29 of the cutting section 15 and threadingly engages the threaded bore 27 permitting the cutting section 15 to be securely fastened to the the intermediate section 19. The rearward portion or the portion of the threaded bore 27 adjacent the rearward section 23 is adapted to receive the threaded end of a drawbar 31 to securely fasten the intermediate section 19 to the rearward section 23. The intermediate section 19 is preferably made of steel material or other threadable material.

As illustrated in FIG. 1, the intermediate section 19 is provided with a stop 26 which extends into the threaded bore 29. The stop 26 is in the form of a projection extending into the bore 29 to limit the distance that the drawbar 31 can be axially inserted into the bore 29 thereby assuring that the threaded fastener 28 can have a sufficient axial distance to permit firm attachment.

As shown in FIG. 2, the rearward end of the intermediate section 19 is connected to the rearward section 23. The rearward section 23 may be made by extruding a hollow cylindrical bar comprising a mixture of refractory metal carbide and metal binder material with an organic binder. The extruded bar is sintered under conditions known in the art to obtain the final cemented carbide. If the bar is solid the section 23 may also be machined by techniques known in the art to hollow out the interior. Preferably, tungsten carbide is utilized as the refractory metal carbide with cobalt the metal binder. The cutting section 15 is preferably formed of a similar type carbide material. It is contemplated that the cemented carbide will include additional refractory metal carbides, such as molybdenum carbide and other binder ingredients to enhance the desirable material properties of the rearward section. Such desirable properties include stiffness, high density, and dimensional accuracy. The interior opening 33 of the cemented carbide rearward section 23 is a cylindrical recess having an interior surface spaced a sufficient distance from the longitudinal axis 13 so that the drawbar 31 can be inserted into the interior opening 33 without interference.

Also, in accordance with the principles of the present invention, the intermediate section 19 forms a connection 35 with the cutting section 15 and the rearward section to provide a stiff juncture between the sections 15, 19, 23. Referring to FIG. 2, the intermediate section 19 includes complementary mating connections 35 and 37 with the cutting section 15 and rearward section 23, respectively. The respective sections 15, 19, and 23 are held in axial alignment by the abutment of the respective end portions of each of the sections 15, 19, 23. The sections 19 and 23 are held in compression by a drawbar 31. The drawbar 31 has one end in engagement with the rearward section 23, the other end in threading engagement with the intermediate section 19. The other end of the drawbar 31 threadingly engages the threaded bore 29 of the intermediate section 19. The rearward end of the drawbar 31 is preferably attached at the end of the rearward section 23 by a nut 39 secured to a threaded end of the draw bar 31.

The drawbar 31 is placed under tension by turning the nut 39 to increase tension on the drawbar 31 and place an increased compressive force on the connection 37. The drawbar 31, as illustrated in FIG. 2, is cylindrically shaped and threaded at each end. The diameter is less than the interior opening 33 so as to permit the drawbar 31 to be easily inserted therein. By tightly drawing the drawbar 31 into tension, the flexure at the respective connection 37 can be reduced and the stiffness of the connection enhanced.

Also in accordance with the principles of the present invention, the respective connections 35, 37 have a preferred geometrical configuration for enhancing the stiffness at the juncture of the sections 15, 19, 23. The combination of utilizing a drawbar 31 and specific configuration geometry is an important feature of the present invention.

Figure 8:
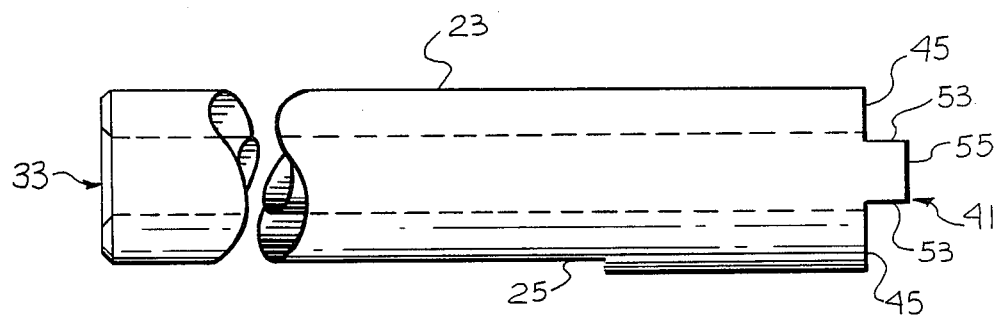
FIG. 8 is a side elevational view of the cemented carbide section.

As shown in detail in FIG. 2, the intermediate section 19 forms complimentary connections 35, 37 with each connection comprising a key 41 (see FIG. 7) and a keyway 43 (see FIG. 8). A pair of first surfaces 45 are associated with the key 41 and a pair of second surfaces 47 are associated with the keyway 43. The first surfaces 45 mate with the second surfaces 47 to provide for utilization of a large cross-sectional area of the respective sections 15, 19, 23 for bearing the compressive force between the sections and maintaining axial alignment. Preferably, the respective surfaces 45, 47 of the respective cutting section 15 and the cemented carbide section 23 comprise a major portion of the cross-sectional area of the respective section 1, 19. The first and second surfaces, 45 and 47, extend on either side of the respective key 41 or keyway 43 and lie substantially within a plane perpendicular to the longitudinal axis 13 of the grooving and threading tool 11.

Figures 5, 6, 7:
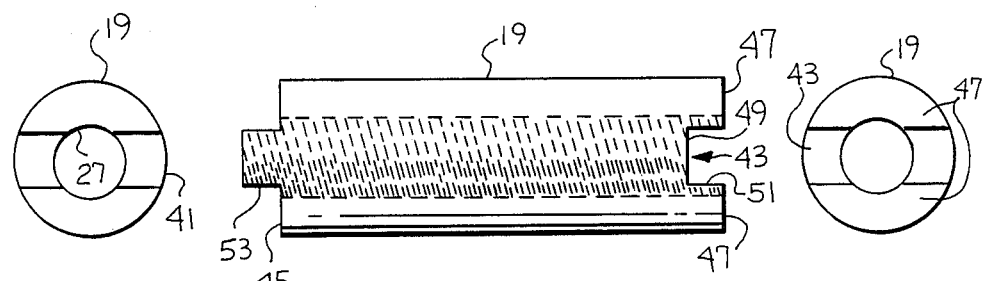
FIG. 5 is an end view of the intermediate section.
FIG. 6 is a rear view of the intermediate section.
FIG. 7 is a side elevational view of the intermediate section.

As shown in FIG. 7, the keyway 43 comprises a transversely extending slot having a rectangular cross-section. The transverse axis of the slot is in alignment with a diameter passing through the axis of the grooving or threading tool 11. The keyway associated with the cutting section 15 at connection 35 is similarly configured. The keyway 43 has a flat bottom wall 49 with planar side walls 51 extending outwardly therefrom. Each of the respective side walls 51 join a respective one of the second surfaces 47. Each of the second surfaces 47 extend laterally outwardly from the keyway 43.

FIG. 8 shows details of the configuration of key 41. The key 41 has a configuration matching the keyway 45. Sides 53 extend diametrically across and project outwardly from the end of a respective section. The sides 53 are joined by planar top wall 55 which matches the bottom wall 49. When the key 41 is inserted into the keyway 43, the sides 53 of the key 41 are closely adjacent the sidewalls 51 of the keyway 43, so that torque from turning the grooving and threading tool 11 is transmitted from one section to the other. The close fit between the key 41 and keyway 43 aids in obtaining the proper axial alignment between respective sections 15, 19, 23. The top wall 55 of the key 41 is preferably spaced from the bottom wall 49 of the keyway 43, so that the compressive forces are borne by the first and second surfaces.

As shown in the partial sectional view of FIG. 1, the drawbar 31 has an enlarged end portion 61 closely adjacent the rearward section 23. The partial section of FIG. 1 shows the enlarged end portion 61 and its relationship with the cylindrical recess of the rearward section 23 as exaggerated to show the details of a sliding precision fit between the drawbar 31 and the rearward section 23. The drawbar 31 is thusly provided with a means for centering the drawbar 31 relative to the rearward section 33 to prevent relative radial movement between an end of the drawbar 31 and the rearward section 23. According to a most preferred sliding precision fit, the tolerance of the inside diameter of the rearward section 23 is held at a total tolerance of less than ten ten thousandths of an inch, and preferably at a total tolerance of less than five ten thousandths of an inch. The drawbar 31 which is of a steel construction is also held to a similar total tolerance. The above description of the sliding precision fit is not intended to limit the present invention since it is believed that greater tolerances may be used for the respective exterior precision surfaces on the exterior of the drawbar 31 and the interior of the rearward section 23.

Also, according to a preferred embodiment of the present invention, the enlarged portion 61 extends rearwardly along the axial direction from the junction of the rearward section 23 a distance sufficient to impart enhanced stiffness to the tool 11. To a certain extent, the preferred rearward extent of the enlarged portion 61 depends on the diameter of the drawbar 31 and the diameter of the cylindrical recess in the rearward section 23 with larger diameters requiring a greater rearward extension of the enlarged portion 61 to result in a proportionally enhanced stiffening effect. Preferably the enlarged portion 61 extends rearwardly a distance along the axis of the drawbar 33 a distance of from about one to about four diameters. The diameter can be either the inside diameter of the cylindrical recess or the outside diameter of the drawbar 31 since both are essentially identical in the area of the sliding precision fit.

In an embodiment as shown in FIG. 2, the respective first surfaces 45 and respective second surfaces 47 comprise a major portion of the cross-sectional area of the grooving or threading tool. The connection between the cutting section 15 and cemented carbide section 23 is shown at 35. The relatively large cross-sectional area of the surfaces 45 and 47 of the respective cutting section 15 and cemented carbide section 23 are in direct mating relationship and bear the compressive force created by the drawbar. Thus, a structure of increased rigidity is provided due to the use of a drawbar and large area of the mating surfaces.

I claim:

1. An elongated grooving and threading tool of the type having a radially projecting cutting edge, said tool comprising a cutting section having an axially extending bore and a radially projecting cutting edge, a hollow cylindrically shaped rearward section comprising cemented carbide, a cylindrically shaped intermediate section having a threaded axially aligned bore extending therethrough, said intermediate section positioned intermediate said cutting section and said cemented carbide section, a first connection formed at the juncture of said intermediate section and said cutting section, a fastener threadingly engaging said threaded bore for holding said cutting section and said intermediate section together at said first connection, a second connection formed at the juncture of said intermediate section and said rearward section, a drawbar connected between said cutting section and said rearward cemented section under tension for holding said intermediate section and said rearward section in axial alignment along said axis under a compressive force, means for centering said drawbar relative to the rearward section for preventing relative radial movement between the forward end of said drawbar and the rearward section, each of said first and said second connections comprising a key and a keyway and a pair of first and second surfaces.

2. An elongated grooving or threading tool according to claim 1 wherein said drawbar includes a nut for securing said drawbar to the rearward section.

3. An elongated grooving or threading tool according to claim 1 wherein said cross-sectional area of said respective surfaces comprise about a major portion of the cross-sectional area of said cutting section and said intermediate section.

4. An elongated grooving or threading tool according to claim 1 wherein said means for centering said drawbar comprises providing said drawbar with an enlarged end portion closely adjacent the cutting section, said enlarged portion being adapted for providing a sliding precision fit between the drawbar and the rearward section within said hollow rearward section for preventing relative radial movement between the forward end of said drawbar and the rearward section.

5. An elongated grooving or threading tool according to claim 4 wherein said enlarged portion extends rearwardly along the axial direction from the junction of the rearward section a distance sufficient to impart enhanced stiffness to the tool.

6. An elongated grooving or threading tool according to claim 5 wherein said enlarged portion extends rearwardly a distance of from about one to about four diameters wherein said diameter corresponds to the diameter of said enlarged portion at said sliding precision fit.

* * * * *